United States Patent Office 3,353,002
Patented Nov. 14, 1967

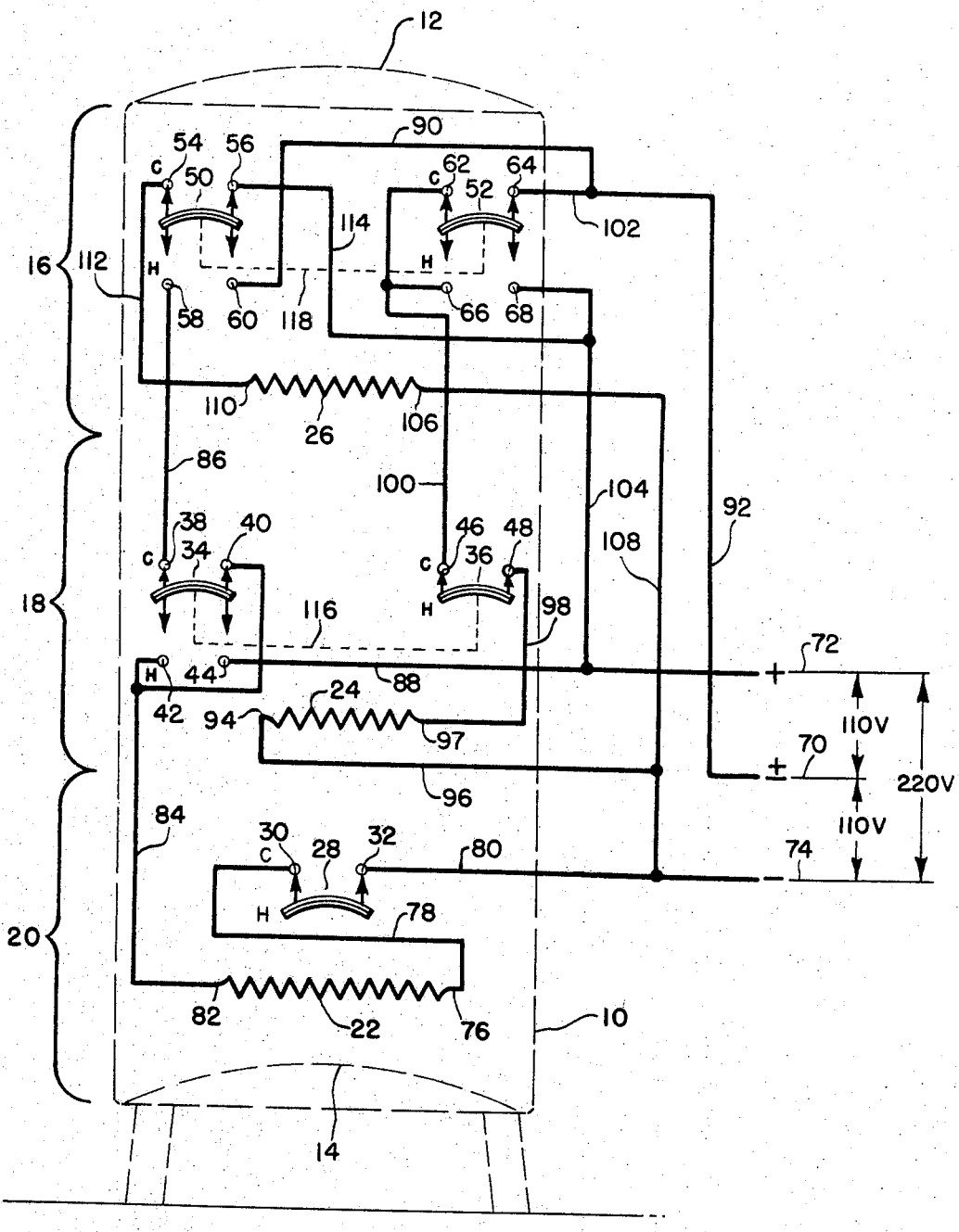

3,353,002
ELECTRIC WATER HEATER CIRCUIT
Edward L. Macoicz, Shorewood, and Allyn H. Fitzpatrick, Greendale, Wis., assignors to General Electric Company, a corporation of New York
Filed Apr. 28, 1965, Ser. No. 451,489
4 Claims. (Cl. 219—321)

ABSTRACT OF THE DISCLOSURE

Electric heater circuit means for a water tank having a lower water inlet portion, an upper water outlet portion and a middle portion. The circuit means includes first, second and third electrical resistance heating elements located in the tank lower, middle and upper portions, respectively, and five thermostatic switching devices. The thermostatic switching devices are so positioned that two sense the temperature in the tank upper portion, two sense the temperature in the tank middle portion and one senses the temperature in the tank lower portion. The heating elements are energized through the switching devices from a three-wire single-phase power supply system which includes two outer lines and an intermediate neutral line. The arrangement of the circuit means is such that at no time are more than two of the electrical heating elements energized; only one of these across the outer lines and the other across one of the outer lines and the neutral line, or being de-energized. The circuit means are so arranged that the greatest amount of heat is provided by the heating element in that portion of the tank where the heat is most beneficial.

---

This invention relates to an electric water heater circuit. More specifically, it relates to an electric water heater circuit which provides improved recovery as well as automatic flexibility of recovery.

It is an object of this invention to provide an electric water heater having rapid recovery, but without placing an excessive current demand on the power system supplying the water heater.

It is an object of this invention to provide an electric water heater wherein the heat is provided in that portion of the tank where it is most needed for a rapid recovery. It is an object of this invention to provide an electric water heater having automatic flexibility of recovery.

It is another object of this invention to provide an electric water heater, having both rapid recovery and flexibility of recovery, which is economical to produce through the use of existing standard circuit components.

It is a further, more specific object of this invention to provide an electric water heater wherein the above goals are achieved by providing a control system which will, in response to indications of water temperature in different parts of the tank, provide for energization of different heaters either across 220 volts or across only 110 volts.

These objects are accomplished in accordance with this invention, in one form thereof, by providing a water heater tank with three electrical heating elements and with five thermostatic switching devices. The electrical heating elements are energized through the switching devices from a three-wire single-phase power system. The switching devices are positioned so as to be sensitive to the tank temperature in its upper, middle and lower portions. The circuit arrangement is such that at no time are more than two of the electrical heating elements energized, and only one of these is energized by 220 volts, the other being energized by 110 volts, or being off. The circuit is so arranged that the greatest amount of heat is provided by the heating element in that portion of the tank where the heat is most beneficial.

Other objects and further details of that which is believed to be novel in the invention will be clear from the following description and claims taken with the accompanying drawing wherein:

The figure of the drawing is a circuit diagram of the arrangement of this invention for energizing heating elements of an electric water heater, and shows the physical location of circuit components with respect to the water tank.

A cylindrical water heater tank 10 which has a domed top 12 and a concave bottom 14 is divided into three portions, an upper portion 16, a middle portion 18, and a lower portion 20, to aid in describing the location of the circuit components. For proper operation of an improved circuit arrangement of this invention, it is necessary to locate the electrical circuit elements in a particular portion of the tank 10. A first electrical heating element 22 is located in the lower portion 20 of the tank. A second electrical heating element 24 is located in the middle portion 18 of the tank, and a third electrical heating element 26 is located in the upper portion 16 of the tank. The heating elements, which are typically sheathed waterproof electrical resistance elements, are placed within the tank 10, with their electrical connections extending through sealed apertures in the tank wall. The energization of the three electrical heating elements is controlled by five thermally responsive switches.

A first thermally responsive switch 28, which is provided with a pair of normally closed contacts 30 and 32, is responsive to the temperature of the lower portion 20 of the tank. Two thermally responsive switches 34 and 36 are responsive to the temperature of the middle portion 18. Thermally responsive switch 34 is of a double-throw type provided with a pair of normally closed contacts 38 and 40, and a pair of normally open contacts 42 and 44. Thermally responsive switch 36 has a pair of normally closed contacts 46 and 48. Two thermally responsive switches 50 and 52 are responsive to the temperature of the upper portion 16. Thermally responsive switch 50 is of a double-throw type provided with a pair of normally closed contacts 54 and 56 and a pair of normally open contacts 58 and 60. Thermally responsive switch 52 is similar to switch 50 in that it also is of a double-throw type provided with a pair of normally closed contacts 62 and 64, and a pair of normally open contacts 66 and 68. One convenient location for the thermally responsive switches is on the outer wall of the tank in a heat transfer relationship with respect to the wall so as to be responsive to the temperature of the water within the tank.

The electrical heating elements 22, 24 and 26 are energized through the five thermally responsive switches from a three-wire single-phase power system. The power lines are conveniently identified as a neutral line 70, and outer lines 72 and 74. Instantaneous polarities of these lines are shown in the figure. The line voltages provided by this three-wire system, 110 volts between the neutral line 70 and the outer lines 72 and 74, and 220 volts between the two outer lines, are shown in the right-hand portion of the figure.

A first terminal 76 of heating element 22 is connected to normally closed contact 30 of switch 28 by a conductor 78. The other normally closed contact 32 of switch 28 is connected to outer line 74 by a conductor 80. A second terminal 82 of heating element 22 is connected to both normally closed contact 40 and normally open contact 42 of switch 34 by a conductor 84. The other normally closed contact 38 of switch 34 is connected to normally open contact 58 of switch 50 by a conductor 86. Normally open contact 44 of switch 34 is connected to outer line 72 by a conductor 88. Normally open contact 60 of switch 50 is connected to the neutral line 70 by conductors 90 and 92.

A first terminal 94 of heating element 24 is connected to outer line 74 by a conductor 96. A second terminal 97 of heating element 24 is connected to normally closed contact 48 of switch 36 by a conductor 98. The other normally closed contact 46 of switch 36 is connected by a conductor 100 to normally closed contact 62 and normally open contact 66 of switch 52. The other normally closed contact 64 of switch 52 is connected to the neutral line 70 by a conductor 102 and conductor 92. The other normally open contact 68 of switch 52 is connected to outer line 72 by a conductor 104.

A first terminal 106 of heating element 26 is connected to outer line 74 by a conductor 108. A second terminal 110 of heating element 26 is connected to normally closed contact 54 of switch 50 by a conductor 112. The other normally closed contact 56 of switch 50 is connected to outer line 72 by a conductor 114 and conductor 104.

The operation of the circuit arrangement of this invention will now be described assuming that the tank 10 has been completely filled with cold water. Under such a condition, the thermally responsive switches 28, 34, 36, 50 and 52 will move to the positions indicated by the letters C in the figure. The letters C indicate the normal or cold position of the thermally responsive switches. The letters H indicate the actuated or hot position of the thermally responsive switches. During the first stage of recovery, with the tank filled with cold water, all of the normally closed contacts will be closed and all of the normally open contacts will be open. Although the first terminal 76 of heating element 22 is connected to outer line 74 by the normally closed contacts 30 and 32 of thermally responsive switch 28, its second terminal 82 is not connected to a power line. The circuit from the second terminal 82 terminates in normally open contact 42 of switch 34, and normally open contact 58 of switch 50.

Considering heating element 24, its first terminal 94 is connected directly to outer line 74 by conductor 96. Its second terminal 97 is connected to the neutral line 70 through the normally closed contacts 46 and 48 of switch 36, and the normally closed contacts 62 and 64 of switch 52. Heating element 24, located in the middle portion 18, is therefore energized at 110 volts.

Heating element 26 has its first terminal 106 connected directly to the outer line 74 by conductor 108. Its second terminal 110 is connected to outer line 72 through the normally closed contacts 54 and 56 of switch 50. Heating element 26, located in the upper portion 16, is therefore energized at 220 volts.

Thus, the greatest amount of heat is provided by heating element 26 which is located in the upper portion 16. Heating element 26 will heat the water in the upper portion 16, which water is the first to be drawn off by a user. Recovery will first occur in the upper portion 16, whereupon the switches 50 and 52 will move to their second or hot positions, indicated by the letters H. Switches 28, 34, 36, 50 and 52 are adjusted to move from their normal or cold positions indicated by the letters C, to their second or hot positions indicated by the letters H at approximately the same predetermined temperature.

During the second stage of recovery, with the water in the top portion 16 already heated, the first terminal 76 of heating element 22 is connected to outer line 74, and the second terminal 82 is connected to neutral line 70 through the normally closed contacts 38 and 40 of switch 34 and the now closed, normally opened contacts 58 and 60 of switch 50. The first terminal 94 of heating element 24 is connected directly to outer line 74, and the second terminal 97 is connected to outer line 72 through the normally closed contacts 46 and 48 of switch 76 and the now closed, normally open contacts 66 and 68 of switch 52. During this second stage of recovery the second terminal 110 of heating element 26 is not connected to a power line, since the circuit from it terminates in the now open, normally closed contact 54 of switch 50.

Thus, during the second stage of recovery heating element 22 in the lower portion of the tank is energized by 110 volts, heating element 24 in the middle portion is energized by 220 volts, and heating element 26 in the top portion is de-energized. The greatest amount of heat is provided by heating element 24 in the middle portion 18, where it is most needed, and no heat is provided in the upper portion 16 which has already reached the predetermined temperature. When the water in the middle portion 18 of the tank reaches the predetermined temperature, switches 34 and 36 will move to their second or hot positions, which are indicated by the letter H.

During this third stage of recovery the first terminal 76 of heating element 22 is connected to the outer line 74 through the normally closed contacts 30 and 32 of switch 28, and its second terminal 82 is connected to outer line 72 through the now closed, normally open contacts 42 and 44 of switch 34. The second terminal 97 of heating element 24 is connected to the now open, normally closed contact 48 of switch 36; thus heating element 24 is de-energized. Since the top portion 16 of the tank remains at or above the predetermined temperature, switch 50 remains in its second or hot position and, therefore, heating element 26 remains de-energized. During the third stage of recovery, only heating element 22, which is located in the lower portion 20, is energized, but it is energized at 220 volts. Thus, the maximum amount of heat is provided in the lower portion 20 where it is most needed.

During draw-off of hot water from the top of the tank, cold water enters the tank near the bottom 14 (inlet not shown). Therefore during draw-off, switch 28, in the lower portion 20, is the first to return to its normal position indicated by the letter C. Heating element 22 is re-energized by being connected across the two outer lines by a circuit completed through the normally closed contacts 30 and 32 of switch 28 and the now closed, normally open contacts 42 and 44 of switch 34. If the draw-off of hot water from the tank should continue at a rate such that the recovery provided by heating element 22 is not sufficient to heat the cold water which has entered the tank, the stratum of cold water within the tank will rise into the middle portion 18, whereupon switches 34 and 36 will move to the positions indicated by the letters C. The recovery now provided is similar to that provided during the second stage of recovery previously described. Heating element 22 is connected across neutral line 70 and outer line 74 by a series circuit comprising the normally closed contacts 30 and 32 of switch 28, the normally closed contacts 38 and 40 of switch 34 and the now closed, but normally open contacts 58 and 60 of switch 50. Heating element 24 is connected across the two outer lines 72 and 74 by a series circuit comprising the normally closed contacts 46 and 48 of switch 36 and the now closed, but normally open contacts 66 and 68 of switch 52.

If draw-off of hot water from the tank 10 continues at a rate such that the recovery provided by the energization of heating element 22 at 110 volts and of heating element 24 at 220 volts is not sufficient, and the temperature of upper portion 16 drops below the predetermined temperature, the switches 50 and 52 will return to their normal positions indicated by the letters C. All of the switches are now in their normal positions as indicated by the letters C, and the recovery is the same as that provided when the tank was first filled with cold water. In order to provide rapid recovery, the greatest amount of heat is provided by heating element 26 which will heat the water closest to the outlet first.

The circuit arrangement of this invention provides three levels of recovery in an electric water heater provided with three electrical heating elements. The top element 26 is controlled only by the top thermally responsive switch means; the middle element 24 is controlled by both the middle and top switch means; and the bottom element 22 is controlled by switch means at all three levels.

The heating elements 22, 24 and 26, which are preferably identical, are in a particular embodiment rated to each provide 3,000 watts when energized at 220 volts. Therefore, when a heating element is energized by 110 volts it provides only 750 watts, or one-fourth of its rated power. The maximum load presented to the supply circuit occurs with one element energized at 110 volts and a second element energized at 220 volts, which is a total load of 3,750 watts. With this maximum load demand, the current demand upon any line of the supply circuit is within a 30 ampere limit, which is a desirable maximum for a circuit supplying a water heater.

Thermally responsive switches 34 and 36 may, of course, be combined into a single unit as represented by the dotted line 116, even though they have been shown as separate units. The same is true of switches 50 and 52, as shown by dotted line 118.

While a particular embodiment of the invention has been shown, other embodiments of the invention will be apparent to those skilled in the art, and it is intended to cover by the appended claims all embodiments falling within the scope thereof.

What is claimed as new and desired to be secured by Letters Patent of the United States is:

1. In an electric water heater, an arrangement for energizing three electrical heating elements from a three-wire single-phase system which includes a neutral line and first and second outer lines, comprising:

(a) a water tank having a lower water inlet portion, an upper water outlet portion and a middle portion, (b) a first electrical heating element disposed within said water tank in said lower portion, said first electrical heating element having first and second terminals, (c) a second electrical heating element disposed within said water tank in said middle portion, said second electrical heating element having first and second terminals, (d) a third electrical heating element disposed within said water tank in said upper portion, said third electrical heating element having first and second terminals, (e) means connecting said first terminals of said second and third electrical heating elements to the first outer line, (f) a first thermally responsive switch connected to said first terminal of said first electrical heating element in series with said first electrical heating element and the first outer line, said first thermally responsive switch being normally closed, and opening when water in said lower portion of said tank reaches a first predetermined temperature, (g) a second thermally responsive switch connected to said second terminal of said second electrical heating element in series with said second electrical heating element, said second thermally responsive switch being normally closed, and opening when water in said middle portion of said tank reaches a predetermined temperature approximately the same as said first predetermined temperature, (h) a third thermally responsive switch connected in series with said second electrical heating element and said second thermally responsive switch, said third thermally responsive switch being of a double-throw type normally connecting, through said second thermally responsive switch, said second terminal of said second electrical heating element to the neutral line; and connecteing said second terminal of said second electrical heating element to the second outer line when water in said upper portion of said tank reaches a predetermined temperature approximately the same as said first predetermined temperature, whereby said second electrical heating element is provided with two levels of energization for automatic flexibility of recovery of water temperature within said tank, (i) a fourth thermally responsive switch connected in series with said third electrical heating element, said fourth thermally responsive switch being of a double-throw type normally connecting said second terminal of said third electrical heating element to the second outer line; and connecting said second terminal of said first electrical heating element to the neutral line, when water in said upper portion of said tank reaches a predetermined temperature approximately the same as said first predetermined temperature, and (j) a fifth thermally responsive switch connected in series with said first electrical heating element, said fifth thermally responsive switch being of a double-throw type normally connecting, through said fourth thermally responsive switch, said second terminal of said first electrical heating element to the neutral line; and connecting said second terminal of said first electrical heating element to the second outer line when water in said middle portion of said tank reaches a predetermined temperature approximately the same as said first predetermined temperature, whereby the electric water heater is provided with automatic flexibility of recovery, with the heat being provided in that portion of the tank where it is most useful.

2. In an electric water heater, an arrangement for energizing three electrical heating elements from a three-wire single-phase system which includes a neutral line and first and second outer lines, comprising:

(a) a water tank having a lower water inlet portion, an upper water outlet portion and a middle portion, (b) a first electrical heating element disposed within said water tank in said lower portion, said first electrical heating element having first and second terminals, (c) a second electrical heating element disposed within said water tank in said middle portion, said second electrical heating element having first and second terminals, (d) a third electrical heating element disposed within said water tank in said upper portion, said third electrical heating element having first and second terminals, (e) means connecting said first terminals of said second and third electrical heating elements to the first outer line, (f) first thermally responsive switch means having a pair of normally closed contacts connected in series with said first electrical heating element and the first outer line, said normally closed contacts opening when water in said lower portion of said tank reaches a first predetermined temperature, (g) second thermally responsive switch means having a first pair of normally closed contacts connected in series with said second terminal of said second electrical heating element, and having a second pair of normally closed contacts connected in series with said first electrical heating element, said first and second pairs of normally closed contacts opening when water in said middle portion of said tank reaches the predetermined temperature, said second thermally responsive switch means also having a pair of normally open contacts, said pair of normally open contacts closing when water in said middle portion of said tank reaches a predetermined temperature approximately the same as said first predetermined temperature, to connect the second terminal of said first electrical heating element to the second outer line, and (h) third thermally responsive switch means having first and second pairs of closed contacts, and first and second pairs of normally open contacts, said first pair of normally closed contacts connecting said second terminal of said third electrical heating element to the second outer line, said second pair of normally closed contacts connecting said second terminal of said second electrical heating element to the neutral line through said first pair of normally closed contacts of said second thermally responsive switch means, said first and second pairs of normally closed contacts being opened, and said first and second pairs of normally open contacts being closed when water in said upper portion of said tank reaches a predetermined temperature approximately the same as said first predetermined temperature, said first pair of normally open contacts which are now closed connecting said second terminal of said first electrical heating element to the neutral line through said second pair of normally closed contacts of said second thermally responsive switch means, said second pair of normally open contacts which are now closed connecting said second terminal of said second electrical heating element to the second outer line through said first pair of normally closed contacts of said second thermally responsive switch means, whereby said water heater is provided with automatic flexibility of recovery.

3. In an electric water heater, an arrangement for energizing three electrical heating elements from a 3-wire single-phase system which includes a neutral line and first and second outer lines, comprising:

(a) a water tank having a lower water inlet portion, an upper water outlet portion and a middle portion, (b) a first lower electrical heating element disposed within said water tank in said lower portion, (c) a second middle electrical heating element disposed within said water tank in said middle portion, (d) a third upper electrical heating element disposed within said water tank in said upper portion, (e) first thermally-responsive switch means positioned to sense the temperature of water in the lower portion of said tank, said first switch means having a first position below a first predetermined sensed water temperature and a second position above said predetermined sensed water temperature, (f) second thermally responsive switch means positioned to sense the temperature of water in the middle portion of said tank and including a single-throw switch portion and a double-throw switch portion, said second switch means having a first position below a second predetermined sensed temperature of water approximately the same as said first predetermined temperature and a second position above said second predetermined temperature, (g) third thermally responsive switch means positioned to sense the temperature of water in said upper portion of said tank and including two double-throw switch portions, said third switch means having a first position below a third predetermined sensed temperature of water approximately the same as said first predetermined temperature and having a second position above said third predetermined sensed temperature, (h) first circuit means including said first, second and third switch means cooperatively connecting said third heating element for energization across said first and second outer lines, connecting said second heating element for energization across one of said outer lines and said neutral line, and disconnecting said first heating element from energization across said lines when all three switch means are in their first positions, (i) second circuit means including said first, second and third switch means connecting said second heating element for energization across said first and second outer lines, connecting said first heating element for energization across one of said outer lines and said neutral line, and disconnecting said third heating element from energization across said lines when said third switch means is in its second position and said first and second switch means are in their first positions, and (j) third circuit means including said first, second and third switch means cooperatively connecting said first heating element for energization across said first and second outer lines and disconnecting said second and third heating elements from across said lines when said first switch means is in its first position, and said second and third switch means are in their second positions.

4. The electric water heater arrangement defined in claim 3 wherein said first switch means is connected in said circuit means to control only said first heating element, said second switch means is connected in said circuit means to control both said first and second heating elements, and said third switch means is connected in said circuit means to control all three of said heating elements.

References Cited
UNITED STATES PATENTS 2,380,545   7/1945   Pankow _____ 219—321
3,162,752   12/1964  Kinsella _____ 219—330 X ANTHONY BARTIS, *Primary Examiner.*